Figure 1:
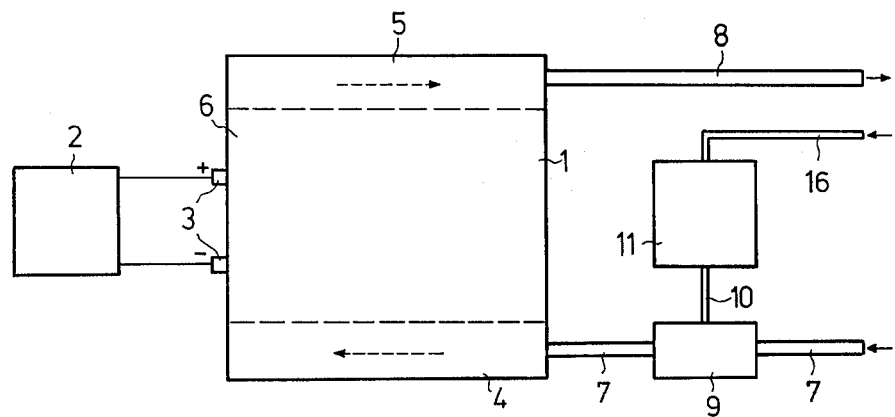

United States Patent [19]

Huhta-Kowisto

[11] 3,941,616
[45] Mar. 2, 1976

[54] SEA WATER BATTERY
[75] Inventor: Esko Ensio Huhta-Kowisto, Haukilahti, Finland
[73] Assignee: Puolustusministerio, Helsinki, Finland
[22] Filed: Oct. 2, 1974
[21] Appl. No.: 511,195

Related U.S. Application Data
[63] Continuation-in-part of Ser. No. 309,132, Nov. 24, 1972, abandoned.

[30]   Foreign Application Priority Data
   Nov. 25, 1971   Finland.............................. 3380/71

[52] U.S. Cl............................. 136/100 M; 136/160
[51] Int. Cl.² .......................................... H01M 6/00
[58] Field of Search............................ 136/100, 160

[56]            References Cited
              UNITED STATES PATENTS

| | | | |
|---|---|---|---|
| 3,012,087 | 12/1961 | Van Billiard et al........... | 136/100 M |
| 3,463,671 | 8/1969 | Doll et al. ........................ | 136/100 R |
| 3,470,032 | 9/1969 | Egan ................. | 136/100 R |
| 3,542,598 | 11/1970 | White et al. .................... | 136/100 R |
| 3,607,428 | 9/1971 | Marzolf........................... | 136/100 R |
| 3,713,413 | 1/1973 | Nakamura .......................... | 136/100 |

*Primary Examiner*—G. L. Kaplan
*Assistant Examiner*—C. F. LeFevour
*Attorney, Agent, or Firm*—Richards & Geier

[57] ABSTRACT

A so-called sea water battery is disclosed which has a battery cell system with electrode plates, preferably magnesium and silver chloride plates, and using as electrolyte a solution of chemicals introduced from the outside into its cell system. According to a particular charcteristic of the invention, the pipe or duct by which water is supplied into the cells contains an ejector mechanism drawing from a particular tank a solution of chemicals and admixing this solution with the feed water. The chemicals thus introduced into the battery serve one or several of the following purposes: to increase the conductivity of the electrolyte; to counteract excessively vigorous dissolution of the electrode materials; and to improve the efficiency of the electrolyte.

According to an optional characteristic of the invention, the chemicals to be introduced as has been said are provided in said particular tank in solid form, and water is passed through said tank to solve them and to carry them off.

According to further optional characteristics, the equipment forming, in combination, a complete battery unit comprises control equipment and control means, such as valves, and/or a heat exchanger for exchanging heat between the spent electrolyte emerging from the cell system and the entering supply water, these various means being arranged so as to counteract undesirable changes of the battery's voltage output.

5 Claims, 3 Drawing Figures

SEA WATER BATTERY

This application is a continuation in part of the copending patent application Ser. No. 309,132, filed Nov. 24, 1972 now abandoned.

The present invention concerns a sea water battery, the battery cell system of which consists of electrode plates most appropriately of magnesium and silver chloride and wherein an aqueous solution of chemicals supplied into the battery cell system serves as electrolyte.

Sea water batteries of the kind specified are used, particularly, as power sources in torpedoes. A sea water battery known in prior art is disclosed in the U.S. Pat. No. 3,012,087; the design solutions of said patent constitute an attempt to obtain a battery having an output voltage which is substantially constant throughout the period of operation of the battery regardless of variations in temperature and salt content of the sea water. The steps taken in order to achieve this aim conprise the reintroduction into the battery cell system of a quantity, controlled by the battery voltage, of spent electrolyte, whereby it is achieved that the electrolyte concentration and temperature increase in a direction tending to cancel the change in voltage. This design solution has the drawback that although an increase of electrolyte concentration and conductivity is achieved, at the same time the electrolyte will also contain, in addition to useful substances, compounds formed in the reaction within the battery and which have a detrimental effect on the efficiency of the battery. The aim of the invention is to eliminate this drawback in a simple manner.

In many regions of the sea, the saline content of the sea water is too low for obtaining the maximum efficiency possible of a sea water battery, compared with the conductivity of the electrolyte. The aim of the invention is to avoid this drawback by simple means so that the conductivity of the electrolyte can be increased e.g. by means of a sodium chloride addition. A further object of the invention is to provide by simple means a sea water battery wherein it is possible to add to the electrolyte chemical substances known in themselves which prevent the excessively vigorous dissolution of the electrode plate material, such as magnesium, into the electrolyte, and substances which reduce the generation of gases in the battery cell system. Of such previously known chemical compounds, the following may be mentioned: lithium chromate ($LiCrO_4$), ammonium chromate ($NH_4CrO_4$) and barium chromate [$Ba(CrO_4)_2$], which substances have been used to increase the efficiency of the electrolyte and in order that a higher current can be drawn from the battery. For the purpose of reducing the gas generation in the battery cell system, again, various chromium salts are known as additives, such as magnesium and lithium chromite.

The above-mentioned aims of the invention are attained in a sea water battery mainly characterized in that in the inlet pipe or duct supplying water into the battery cell system there has been placed an ejector or suction jet pump, which by effect of the supply water flow draws a solution from a tank and admixes this solution to the supply water, said solution containing substances increasing the conductivity of the electrolyte and/or reducing the excessively vigorous dissolution of the electrode plate material, such as magnesium, into the electrolyte and improve the efficiency of the electrolyte.

The invention is described in detail with reference to the embodiment examples schematically presented in the FIGS. of the attached drawing, but to which the invention is by no means confined.

Figure 2:
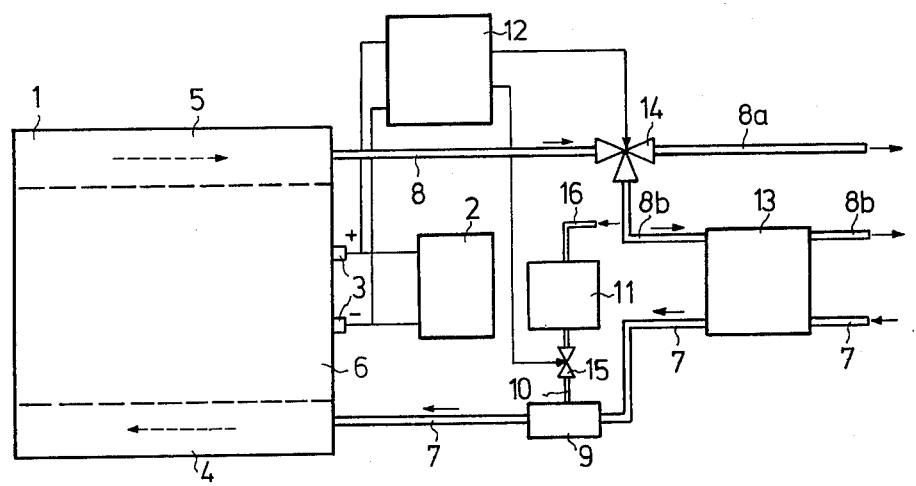
Figure 3:
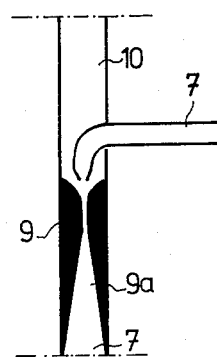

FIG. 1 shows schematically the simplest embodiment of the invention. In FIG. 2 an embodiment is illustrated which also includes control equipment controlling the electrolyte temperature and the content of various additives in a direction tending to counteract the changes in battery voltage. FIG. 3 is a diagram showing the ejector or suction jet pump. It is of the self-priming pump type. It is made of glass or the like and has no movable parts.

The sea water battery in itself is known in prior art, and its detailed design shall not be described in this connection. The cell system 1 of the sea water battery consists of a plurality of electrode plates 6 connected in series and/or in parallel and disposed at a distance from each other. The electrode plates 6 of different polarities have been made e.g. of magnesium and of silver chloride, respectively. Certain other electrode materials may also be considered when sea water containing saline is used as electrolyte. In the figure, the output terminals of the battery with different polarities have been indicated by the reference numeral 3 and the schematically shown external load by the reference numeral 2. In the lower part of the battery cell system 1 the electrolyte input duct 4 is found and, correspondingly, in the upper part the discharge duct 5, by which ducts the sea water used as electrolyte is forced to flow through the interstitial space of the electrolyte plates 6. In the flow paths interconnecting the interstitial space of the electrode plates 6 and the input and discharge ducts 4 and 6, appropriate throttling has been arranged by means known in themselves in such manner that no appreciable short-circuiting of the battery is effected by the said flow paths. The supply water inlet pipe 7 opens into the input duct 4, and the electrolyte discharge pipe 8 correspondingly communicates with the discharge duct 5, for removing the spent electrolyte.

In order to enable the conductivity of the electrolyte to be raised to a level most advantageous in view of the battery's efficiency and in order to prevent excessively vigorous dissolution into the electrolyte of the magnesium plates, it is a feature of the invention that in the water inlet pipe 7 there has been fitted, for a specific solution used in the invention, an ejector 9, which in a manner previously known in itself produces a suction effect when it is passed through by water. Thus, the ejector, also known as the suction jet pump, makes use of the principle that a jet of fluid will entrain surrounding fluid and cause it to flow in the direction of the expanding jet. The passage in which the jet expands is indicated by 9a in FIG. 3. The ejector 9 communicates with the supply pipe 10 of the solution in question, through which into the water inlet pipe 7 a solution increasing the conductivity of the electrolyte and/or preventing too rapid dissolution of the electrode plates is conducted from the tank 11. The tank 11 contains a solution in which certain substances chosen from among those mentioned above are present in solution, such as sodium chloride to increase the conductivity, lithium, ammonium and barium chloride to increase the efficiency of the electrolyte, and chromium salts, e.g. magnesium and lithium chromite, to reduce the gas generation in the battery cell system. The concentration of various constituents in the solution in tank 11 and/or the throttling in the supply pipe 10 is chosen to be such that the battery will operate with the optimum concentrations of different substances in the electrolyte. The supply water may in fact be completely salt-free even though the battery is called a sea water battery. The ejector 9 both draws the said solution and admixes it to the supply water. Of the substances contained in the said solution in the tank 11, sodium chloride may be mentioned, which increases the conductivity of the electrolyte. The electrolyte is conducted through pipe 7 into the battery cell system 6. This arrangement has the advantage that sea water batteries become operable even in sea water regions where the salinity is low.

The additives mentioned above are appropriately contained in the tank 11 in solid form so that the water conducted into the tank 11 by the pipe 16 dissolves the additives, whereby their concentration and the density of the solution increase in downwardly direction in the tank 11, and since the solution is drawn from the tank, by the supply pipe 10, from its lower part, a tank with small space requirements is obtained compared e.g. to the alternative in which ready-made solution would be used in the tank 11. It may be advantageous in certain instances to conduct all of the water to be supplied into the battery cell system 1 through the pipe 16 and tank 11.

If a battery application is concerned which requires, throughout the period of operation of the battery, a voltage which is constant within very narrow limits, one may use the control equipment shown in FIG. 2 to maintain constant voltage. It is well-known that the output voltage of a sea water battery depends both on the electrolyte temperature, that is the temperature of the sea water supply, and on its salt content. Within the ranges of sea water temperature and saline content occurring in practice, this relationship is of a kind implying increase of the battery's output voltage with increasing electrolyte saline content and conductivity as well as increasing temperature. In FIG. 2, voltage control arrangements acting both on the temperature of the electrolyte and on its additive content have been shown, which can be applied either in combination or separately. In FIG. 2 these control devices have been indicated with the reference numeral 12. The control devices 12 measure the battery output voltage at the terminals 3. The additive content of the electrolyte is changed in a direction tending to counteract the change in voltage, by placing in the additive solution supply pipe 10 a control valve 15, which is position-controlled by the control means 12.

It is well-known that in a sea water battery the electrolyte is heated during its passage through the cell system. This heat may be utilized in controlled manner to heat the supply water so that in the electrolyte discharge pipe 8 there is fitted a heat exchanger 13 previously known in itself, and the supply water is arranged to pass through this heat exchanger 13. Temperature control of the supply water has been arranged by providing in the discharge pipe 8 two branches 8a and 8b, one of them (8b) passing through the heat exchanger and the other (8a) by-passing it. The quantitative proportion of electrolyte passing through the heat exchanger and of that by-passing it is regulated by means of a control valve 14, in which capacity a three-way valve serves. The control means 12 control the position of the control valve 14 so as to change the supply water temperature in a direction tending to counteract the change in voltage.

In combination with the voltage control procedures described above, or separately, a control may be applied wherein by means of a control valve the total flow per unit time of electrolyte through the battery cell system 1 is influenced in a direction tending to counteract the change in voltage.

I claim:

1. A discardable sea water battery especially adapted for torpedoes, comprising a battery cell system having electrode plates of magnesium and silver chloride, an input duct connected with said battery cell system, an inlet pipe connected with said input duct, an ejector carried by said inlet pipe, a discharge duct connected with said battery cell system, a discharge pipe connected with said discharge duct, a tank adapted to contain a solution, and means connecting said tank with said ejector and with sea water for supplying sea water to said ejector while mixing it with the solution from said tank, said sea water mixture flowing through said input duct into the battery cell system where it serves an electrolyte and leaving the battery cell system through said discharge pipe, said solution containing chemicals impoving the efficiency of the electrolyte.

2. Sea water battery according to claim 7, characterized in that the tank (11) contains substances in solid form and that into the upper part of the tank water is conducted through a pipe (16) and that said solution is conducted to the ejector (9) through a supply pipe (10) from the lower part of the tank (11), where the density of said solution and the concentration of the different substances are highest.

3. Sea water battery according to claim 2, characterized in that in the supply pipe (10) leading from the tank (11) to the ejector (9) there is a control valve (15), the position of which is controlled by control means (12) governed by the battery voltage, in a direction tending to counteract the changes of said voltage.

4. Sea water battery according to claim 3, characterized in that the water supply to the battery cell system (1) as well as the removal of spent electrolyte has been arranged at least partially to pass through a heat exchanger (13), wherein the spent electrolyte gives off heat to the supply water.

5. Sea water battery according to claim 4, characterized in that in the spent electrolyte discharge pipe (8) there is a control valve (14), by means of which the proportion of electrolyte discharged through the heat exchanger (13) and of directly discharged electrolyte is controlled, the position of the control valve (14) being controlled by control means (12) governed by the battery voltage, in a direction tending to counteract the changes of said voltage.

* * * * *